Sept. 16, 1924.

S. G. FITZ SIMONS

AUTOMOBILE FENDER

Filed June 13, 1924

Inventor
Samuel G. Fitz Simons
by his Attorneys
Baldwin Wight

Sept. 16, 1924.

S. G. FITZ SIMONS

AUTOMOBILE FENDER 1,508,652

Filed June 13, 1924    3 Sheets-Sheet 2

Inventor
Samuel G. Fitz Simons
by his Attorneys

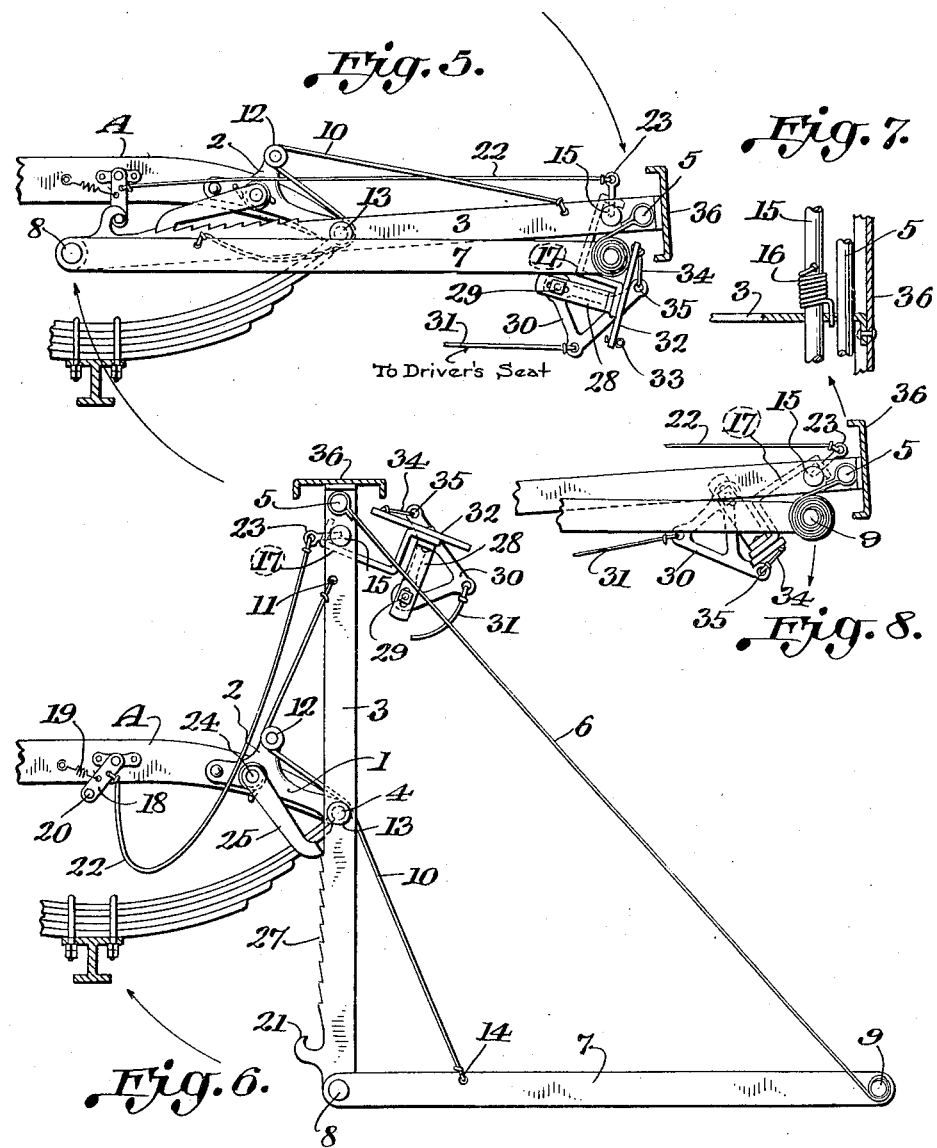

Patented Sept. 16, 1924.

1,508,652

UNITED STATES PATENT OFFICE.

SAMUEL G. FITZ SIMONS, OF CHARLESTON, SOUTH CAROLINA.

AUTOMOBILE FENDER.

Application filed June 13, 1924. Serial No. 719,914.

*To all whom it may concern:*

Be it known that I, SAMUEL G. FITZ SIMONS, a citizen of the United States, and resident of Charleston, in the county of Charleston and State of South Carolina, have invented certain new and useful Improvements in Automobile Fenders, of which the following is a specification.

In certain respects this invention is an improvement on the construction disclosed in my prior Patent No. 1,462,104, granted July 17, 1923.

An object of the invention is to provide a fender of the general type shown in said patent which shall be simple in construction whereby the fender will automatically move and efficient in operation.

Another object is to provide a fender which shall normally be retained in compact closed position, but can at any time be released by the driver of the vehicle for movement to operative position.

A further object is the provision of means whereby the fender will automatically move to open position when released from its holding means, and will thereafter be retained in said position until it is desired to reset the same.

Other objects will be apparent from the following detailed description and the appended claims.

In the drawings:

Figure 5 is a side elevation of the attachment in closed position.

Figure 6 is a similar view with the attachment in open position.

Figure 7 is a top plan view of a detail.

Figure 8 is a side elevation of a front portion of the attachment with the parts in the position at the time when the rear catch is just being released.

Figure 1:
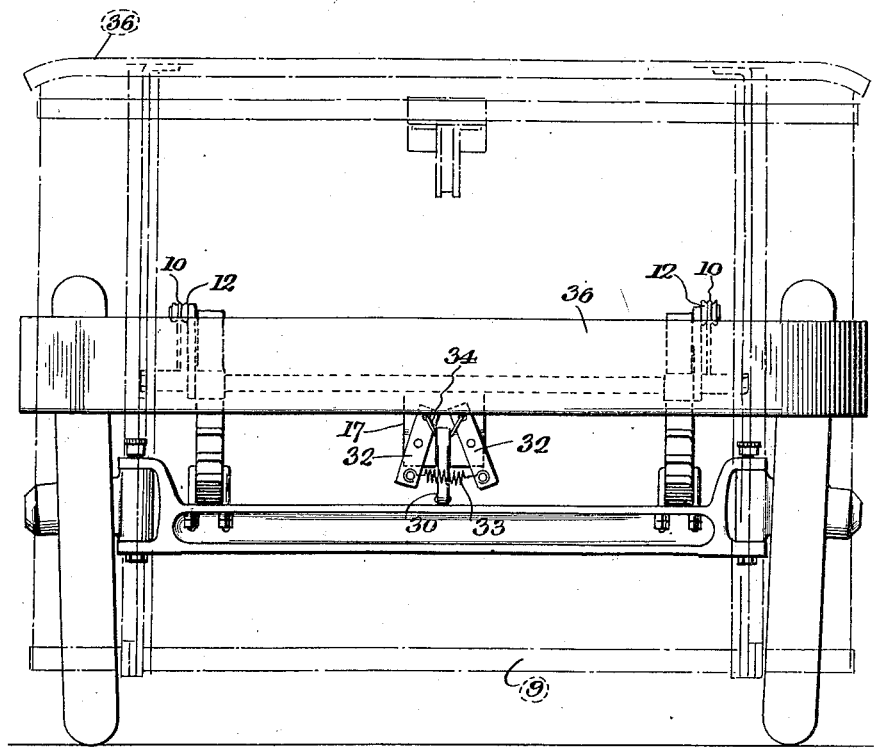
Figure 1 is a front elevation of the attachment in place on an automobile with the parts shown in operative position by dot and dash lines.
Figure 2:
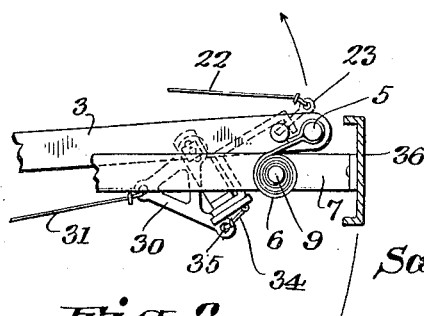
Figure 2 is a side elevation with parts in section of a portion of the mechanism showing a modification.
Figure 3:
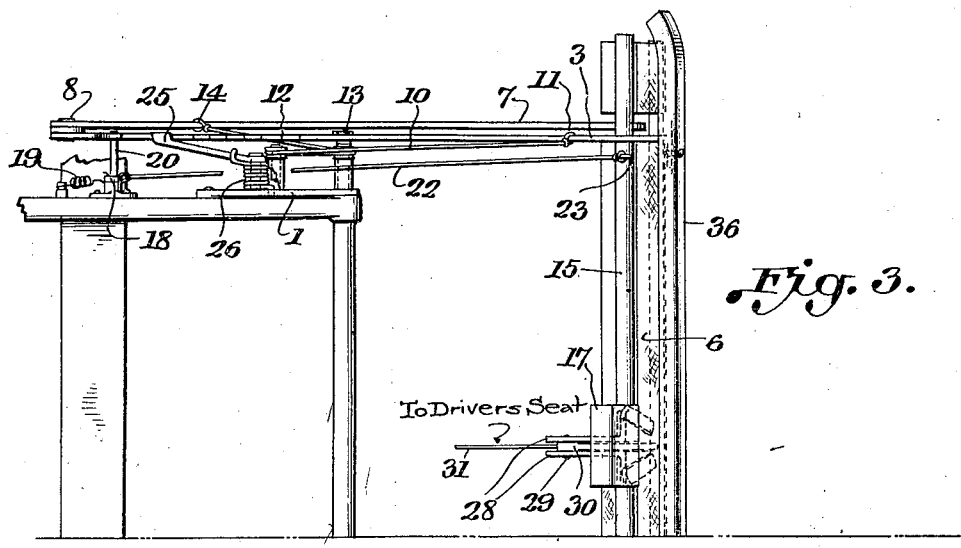
Figure 3 is a top plan view of one side of the attachment when in closed position.
Figure 4:
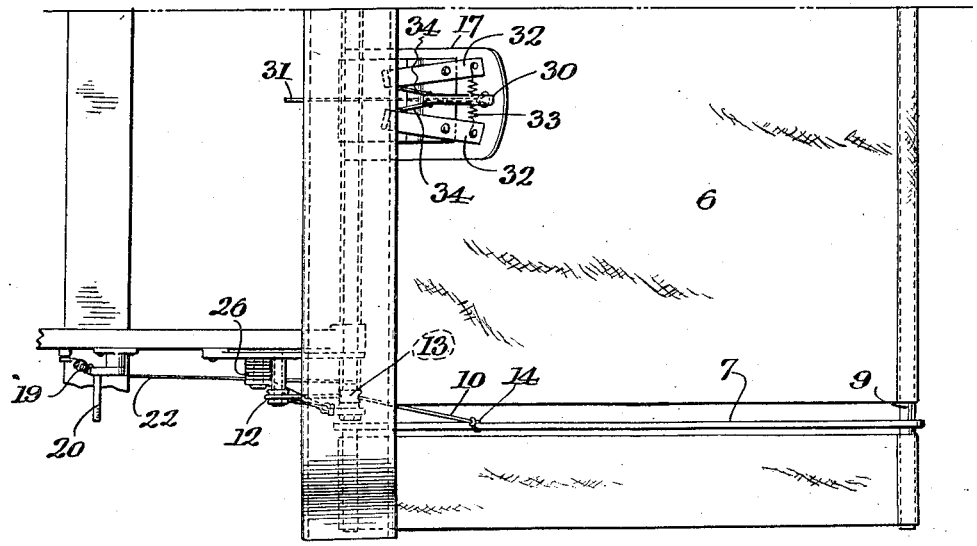
Figure 4 is a similar plan view with the attachment in open or operative position.

To the front ends of the side bars A of an automobile chassis are fastened brackets 1 which have upstanding lugs 2. Main levers 3 are mounted on pivot bolts 4 which extend through the brackets 1 and side bars A. Supported by the levers 3 in one end thereof is a roller 5 to which one end of a curtain 6 is attached. A second lever 7 is pivoted at one end on a pivot 8 to each of the levers 3, and a curtain roller 9 is carried by the other ends of the levers 7. Either of the rollers 5 or 9 may be a spring curtain roller with a light spring sufficient to roll up the curtain when the levers 3 and 7 are moved to their compact position shown in Figure 5.

A wire or cable 10 is attached at 11 to the main lever 3 near its outer end, passes around a roller or pulley 12 carried by the lug 2 of the bracket 1, around and under a second roller or pulley 13, preferably carried by the pivot bolt 4, and is attached at 14 to the lever 7 at a point much closer to the pivot 8 than to the outer end of this lever. This cable causes the levers 3 and 7 to move from closed to open position in synchronism and prevents a sudden dropping of the lever 7 before the lever 3 has reached its proper open position.

Carried by the levers 3 near their front ends is a rod 15 which is normally spring-pressed in one direction by springs 16 each of which is fast at one end to the rod and at the other end to the lever 3 as shown in Figure 7. Near the center of this rod there is fast thereto a bracket 17 which carries latch mechanism hereinafter described in detail.

To the outside of each frame bar A is pivoted a short lever 18 normally drawn rearwardly by a spring 19 and having at its free end a pin 20 which cooperates with a hook member 21 integral with or rigidly carried by the bar 3. A wire or cable 22 is fastened to the lever 18 and at its other end to pin 23 carried by the rod 15. The engagement of the pin 20 and hook 21 tends to hold the parts in the closed position of Figure 5 and the latch mechanism carried by the bracket 17 holds the two curtain rollers in close relation as shown in said figure.

In the release of the front latch mechanism the rod 15 is turned as hereinafter described to move it from the Figure 5 to the Figure 8 position which exerts a forward pull on the cable 22 and therefore moves the free end of the lever 18 forward sufficiently to release the pin 20 from the hook 21, and allow the rear end of the lever 3 to be forced from the Figure 5 to the Figure 6 position. This movement is brought about in the following manner.

Carried by studs 24 on the brackets 1 are pawls 25 normally spring-pressed in one direction by springs 26 coiled around said studs. These pawls engage with rack members 27 on the edge of the levers 3. When the latches are released, the springs 26 rotate the pawls 25 on their studs and force the levers 3 from the position shown in Figure 5 to that of Figure 6, the levers 7 moving in synchronism through the medium of the cable 10 as above explained, and the curtain unrolling to operative position.

The bracket 17 carried by the rod 15 is provided with two ears 28 carrying a pin 29 on which is pivoted a bell crank lever 30. To one arm of the bell crank lever is attached a cable 31 which leads back to a point adjacent the driver's seat. The bracket 17 also carries two detent members 32 which are pivoted thereto near their middle. A spring 33 normally tends to draw these detents into a substantially vertical position when the parts are in the position shown in Figure 5. To the upper ends of the detents 32 is attached a short wire or cable 34 which runs through an eye 35 in the outer end of one arm of the bell crank lever 30.

The operation is as follows. If the parts are in the closed position of Figure 5 and it is desired to release the curtain for use, the driver pulls on the cable 31. The first effect of this is to swing the upper ends of the detents 32 toward each other against the tension of the spring 33 into a substantially horizontal position. As shown the bracket 17 has its lower portion underlying the curtain roller 9 while the detents 32 extend up in front thereof, so that accidental displacement is prevented. After the detents 32 have been swung to substantially horizontal position as described, the continued pull on the cable 31 will rock the bell crank lever 30 about its pivot 29, thus moving the entire latch mechanism out from under the curtain roller 9. A still further pull will rock the rod 15 to the Figure 8 position, thus releasing the rear detent mechanism as above described. While the whole operation takes place as a continuous act, there are really three steps. The first is the movement of the detents 32 by the rocking of the bell crank lever on its pivot; the second is the movement of the bell crank lever with the bracket; and the third is the further movement which rotates the rod sufficiently to disengage the rear latch.

A bumper 36 may be carried by the front ends of the levers 3 or by the front ends of the levers 7. In either case when the parts are in closed position, it substantially conceals the curtain rolls and most of the operative structure of the device from a view taken from the front, and the outer ends of the bumper may be curved rearwardly sufficiently to conceal and protect these parts at their ends.

It is obvious that I have devised a very compact structure with relatively few parts, but which will be moved quickly to operative position. By means of the compensating cord 10, the levers 7 retain a substantially horizontal position at all times. Latch mechanism is provided for both ends of the levers, but both are released by one continuous movement. Obviously various changes may be made without departing from the spirit of the invention, and details may be employed without using all of the features. In general it may be stated that the invention is to be regarded as limited only by the scope of the appended claims.

I claim as my invention:

1. An automobile fender comprising a pair of levers pivoted to the automobile intermediate their ends, a curtain roller carried by said levers at one end thereof, secondary levers pivoted at one end to the free ends of the first mentioned levers, a curtain roller carried by the free ends of the secondary levers, a curtain connecting the two rollers, and means for maintaining the secondary levers in a substantially horizontal position at all times.

2. An automobile fender comprising a pair of levers pivoted to the automobile intermediate their ends, a curtain roller carried by said levers near one end thereof, secondary levers pivoted to the free ends of the first mentioned levers, a curtain roller carried by the free ends of the secondary levers, a curtain connecting the two rollers, guides on said vehicle, and cables connecting the levers and secondary levers and passing about said guides to maintain the secondary levers in a substantially horizontal position at all times.

3. An automobile fender comprising a pair of levers pivoted to the automobile, a curtain roller carried thereby, secondary levers pivoted to the first mentioned levers, a curtain roller carried by the secondary levers, a curtain connecting the two rollers, and flexible means for maintaining the secondary levers in substantially horizontal position at all times.

4. An automobile fender comprising a pair of levers pivoted to the automobile, a curtain roller carried thereby, secondary levers pivoted to the first levers, a curtain roller carried by the secondary levers, a curtain connecting the two rollers, latch mechanism for holding the two curtain rollers adjacent each other when in closed position, latch mechanism for holding the rear ends of the first levers, and means for releasing both latch mechanisms at a single operation.

5. An automobile fender comprising a pair of levers pivoted to the automobile, secondary levers pivoted to the first levers, a curtain roller carried by each pair of levers, a curtain connecting the two rollers, and spring-actuated pawls for swinging the device to operative position.

6. An automobile fender comprising a pair of levers pivoted to the automobile, racks on said levers, pawls pivoted on the automobile and engaging said racks, springs tending to turn said pawls to move the levers to operative position and hold them against reverse movement, and a curtain brought into operative position by such movement of the levers.

7. An automobile fender comprising a pair of levers pivoted to the automobile, secondary levers pivoted to the first levers, a curtain carried by the two pair of levers, means for holding both pair of levers in substantially horizontal position when the device is not in use, means for releasing said holding means at will, and means for moving the first pair of levers to an upright position when the holding means is released.

8. An automobile fender comprising a pair of levers pivoted to the automobile, secondary levers pivoted to the first levers, a curtain carried by the two pair of levers, means for holding both pair of levers in substantially horizontal position when the device is not in use, means for releasing said holding means at will, means for moving the first pair of levers to an upright position when the holding means is released and means for retaining the secondary levers in a substantially horizontal position during their movement to a lower level.

In testimony whereof I have hereunto subscribed my name.

SAMUEL G. FITZ SIMONS.